(12) United States Patent
Takahashi

(10) Patent No.: US 10,704,760 B2
(45) Date of Patent: Jul. 7, 2020

(54) VEHICLE LAMP

(71) Applicant: Koito Manufacturing Co., Ltd., Tokyo (JP)

(72) Inventor: Masahiro Takahashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/569,922

(22) Filed: Sep. 13, 2019

(65) Prior Publication Data
US 2020/0088378 A1    Mar. 19, 2020

(30) Foreign Application Priority Data

Sep. 19, 2018 (JP) ................................. 2018-175162

(51) Int. Cl.
| | |
|---|---|
| F21S 43/19 | (2018.01) |
| F21S 43/50 | (2018.01) |
| F21W 103/10 | (2018.01) |
| F21W 103/55 | (2018.01) |
| F21S 43/14 | (2018.01) |
| F21W 103/35 | (2018.01) |
| F21W 103/20 | (2018.01) |
| F21S 43/31 | (2018.01) |

(52) U.S. Cl.
CPC ............. *F21S 43/195* (2018.01); *F21S 43/50* (2018.01); *F21S 43/14* (2018.01); *F21S 43/31* (2018.01); *F21W 2103/10* (2018.01); *F21W 2103/20* (2018.01); *F21W 2103/35* (2018.01); *F21W 2103/55* (2018.01)

(58) Field of Classification Search
CPC ................................. F21S 43/195; F21S 43/50
USPC .......................................................... 362/546
See application file for complete search history.

(56) References Cited

U.S. PATENT DOCUMENTS

| | | | | |
|---|---|---|---|---|
| 5,410,328 | A  * | 4/1995  | Yoksza ..................... | G09F 9/33 345/82 |
| 6,769,785 | B1 * | 8/2004  | Herst ....................... | F21V 21/00 174/63 |
| 8,939,636 | B2 * | 1/2015  | Choi ........................ | F21S 2/005 362/652 |
| 9,151,454 | B1 * | 10/2015 | Lindblad ................... | F21K 9/20 |
| 9,353,924 | B2 * | 5/2016  | Scarlata .................... | F21S 9/00 |
| 10,018,343 | B2 * | 7/2018  | Wasserman ................ | F21S 8/03 |
| 2009/0009997 | A1 * | 1/2009  | Sanfilippo ................ | F21S 2/005 362/244 |

FOREIGN PATENT DOCUMENTS

JP    2015-197988 A    11/2015

* cited by examiner

*Primary Examiner* — Bryon T Gyllstrom
(74) *Attorney, Agent, or Firm* — Abelman, Frayne & Schwab

(57) ABSTRACT

A vehicle lamp includes a long lamp component, and the lamp component includes a plurality of divided parts arranged in a longitudinal direction thereof and interconnected by a joint structure. The joint structure includes a first claw configured to connect upper surfaces of two adjacent divided parts of the plurality of divided parts and a first claw receiving hole fitted into the first claw, and a second claw configured to connect lower surfaces of the two divided parts and a second claw receiving hole fitted into the second claw.

10 Claims, 8 Drawing Sheets

VEHICLE LAMP

CROSS-REFERENCE TO RELATED APPLICATIONS

This application is based on and claims priority from Japanese Patent Application No. 2018-175162, filed on Sep. 19, 2018, with the Japan Patent Office, the disclosure of which is incorporated herein in its entirety by reference.

TECHNICAL FIELD

The present disclosure relates to a vehicle lamp. Particularly, the present disclosure relates to a vehicle lamp used in a vehicle such as a car.

BACKGROUND

Japanese Patent Laid-Open Publication No. 2015-197988, for example, discloses a relatively long vehicle lamp that may be used as a clearance lamp.

SUMMARY

The present inventors examined a long vehicle lamp and reached to recognize following problems. For design differentiation or other reasons, a fairly long vehicle lamp may be required, but manufacturing costs tend to be high. For example, in order to manufacture a long vehicle lamp such as a tail lamp that extends over substantially an entire width direction of a vehicle, a large manufacturing apparatus corresponding to the length may be required. In a case of a long part made of resin, a large mold and a molding machine is supposed to be used. This is a factor to increase the manufacturing cost.

As an alternative, it is considered to prepare a plurality of short parts and connect the parts as a single long part. A fastening structure by such as screwing or caulking is typically used for such parts connecting. However, the fastening operation is time consuming and may cause the manufacturing cost to be increased. Additionally, a corresponding space is required on the part in order to install the fastening structure on the part. For example, a screw hole or a rivet hole having a size that does not excessively impair the workability is provided in the part, and a wall thickness is provided around the hole to maintain the mechanical strength of the part. Therefore, the fastening structure is also disadvantageous in that it may limit the miniaturization of the part. In other words, when the fastening structure is miniaturized, the fastening operation becomes difficult.

The present disclosure has been made in view of such circumferences, and an object thereof is to facilitate the manufacture of a long vehicle lamp.

In order to solve the above problems, a vehicle lamp according to as aspect of the present disclosure includes a lamp component as a long lamp component, and the lamp component includes a plurality of divided parts disposed in a longitudinal direction thereof and interconnected by a joint structure.

According to the aspect, the plurality of divided parts are connected by the joint structure, and the long lamp component is formed. The joint structure may be expected to improve the workability of connecting the parts as compared to the case where a fastening structure is used. Therefore, manufacturing of a long vehicle lamp may be facilitated.

The joint structure may include a first claw configured to connect upper surfaces of two adjacent divided parts of the plurality of divided parts and a first claw receiving hole fitted into the first claw, and a second claw configured to connect lower surfaces of the two divided parts and a second claw receiving hole fitted into the second claw.

The first claw and the first claw receiving hole may be formed at positions different from the second claw and the second claw receiving hole in a transverse direction of the lamp component.

A first divided part of the two divided parts may include a first tongue having one of the first claw and the first claw receiving hole and protruding in the longitudinal direction from the upper surface of the first divided part, and a second tongue having one of the second claw and the second claw receiving hole and protruding in the longitudinal direction from the lower surface of the first divided part. A second divided part of the two divided parts may include a first groove having the other of the first claw and the first claw receiving hole and formed in the longitudinal direction on the upper surface of the second divided part, and a second groove having the other of the second claw and the second claw receiving hole and formed in the longitudinal direction on the lower surface of the second divided part. The first tongue and the second tongue may be disposed so as to correspond to the first groove and the second groove, respectively, such that, when the first divided part and the second divided part are brought close to each other along the longitudinal direction to be connected, the first tongue is inserted into the first groove and the second tongue is inserted into the second groove.

The lamp component may include a light leakage suppression structure formed between two adjacent divided parts of the plurality of divided parts to suppress light leaking in a transverse direction and/or in a plate thickness direction through a boundary surface between the two adjacent divided parts.

According to an aspect, the vehicle lamp includes a lamp component as a long lamp component, and the lamp component includes a plurality of divided parts disposed in a longitudinal direction thereof. The lamp component includes a light leakage suppression structure formed between two adjacent divided parts of the plurality of divided parts to suppress light leaking in a transverse direction and/or in a plate thickness direction through a boundary surface between the two adjacent divided parts.

According to the present disclosure, manufacturing of a long vehicle lamp may be facilitated.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, preferred exemplary embodiments of the present disclosure will be described based on the drawings. Further, the exemplary embodiments are not intended to limit the present disclosure thereto, but are merely illustrative. All features described in the exemplary embodiments or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited unless specified. In addition, for example, the terms "first" and "second" used herein or the claims are not intended to refer to any order or importance but are intended to discriminate a component from another component. In addition, a portion of members which are not important in describing the embodiment is omitted and displayed in each drawing.

Figure 1:
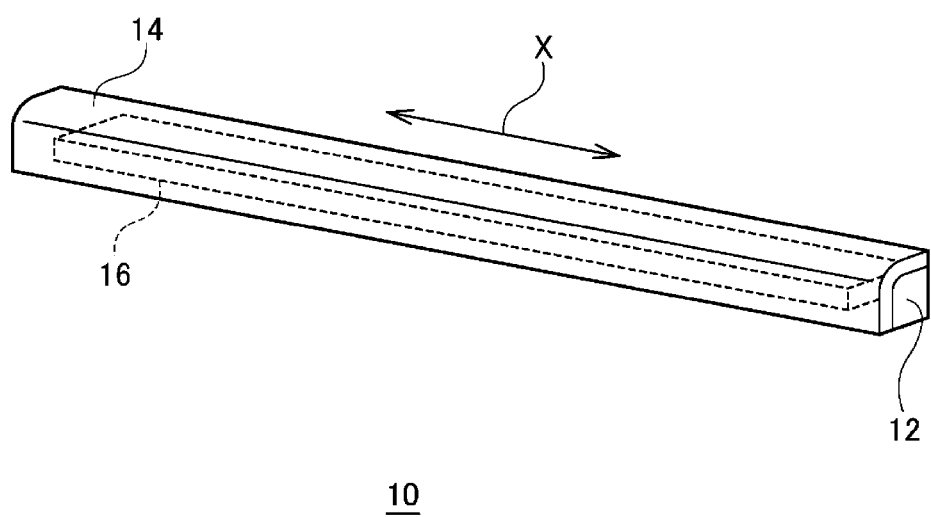
FIG. 1 is a schematic perspective view illustrating a vehicle lamp according to an embodiment.
Figure 2:
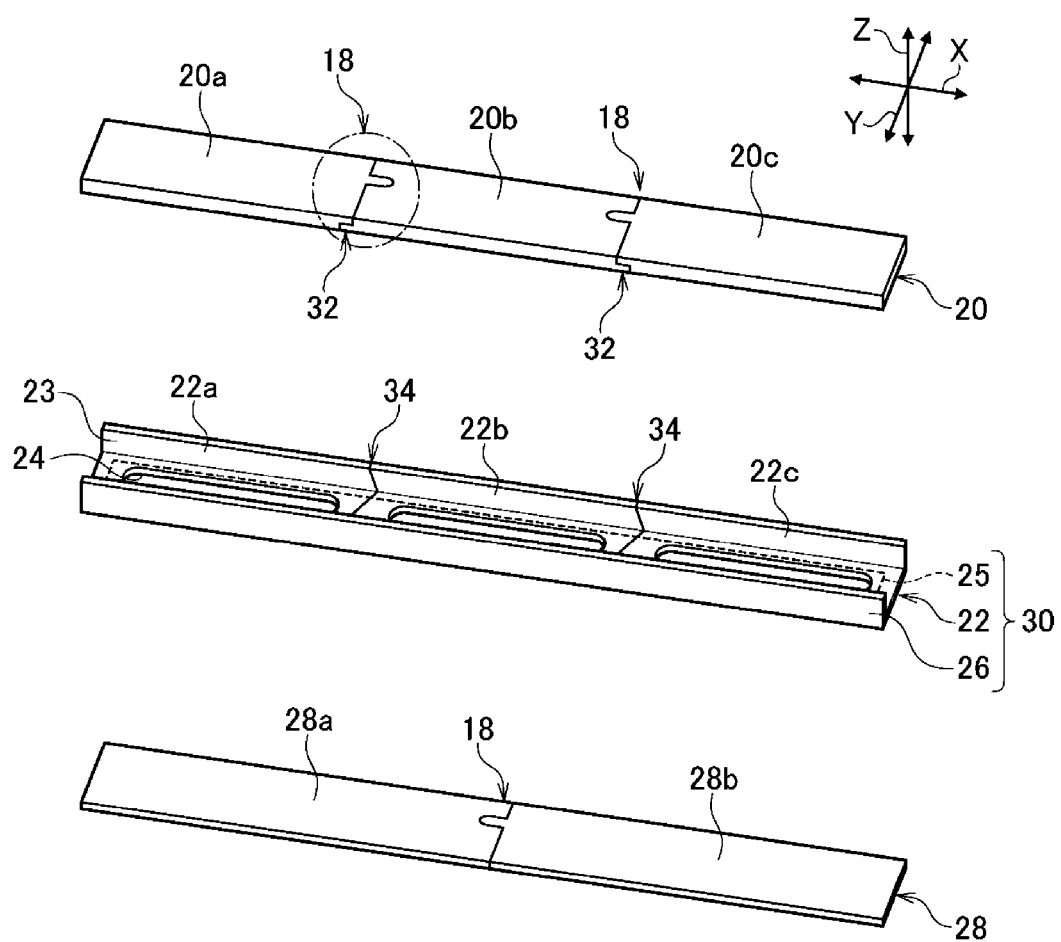
FIG. 2 is a schematic exploded perspective view illustrating a lamp unit according to an embodiment.
Figure 3A:
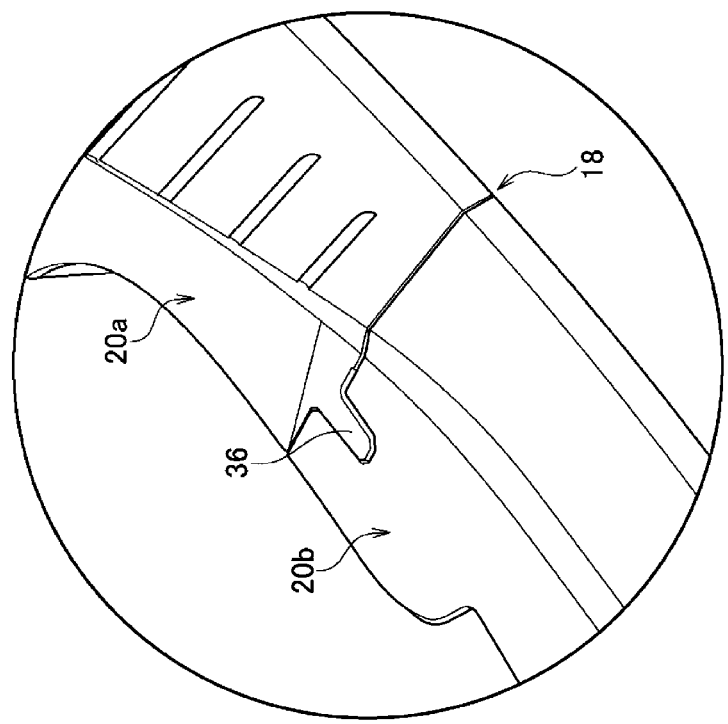
FIGS. 3A and 3B are schematic perspective views of a joint structure of a lamp component according to an embodiment as viewed from above.
Figure 3B:
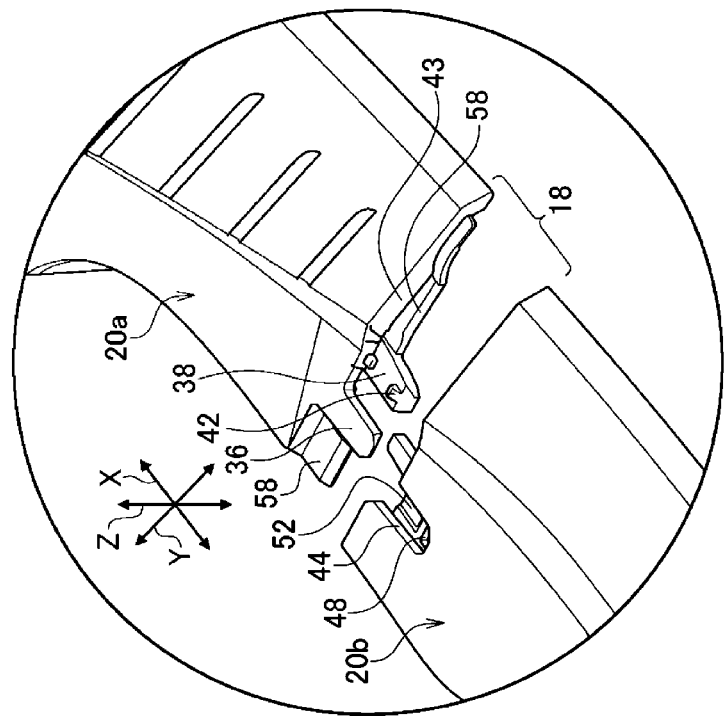
Figure 4B:
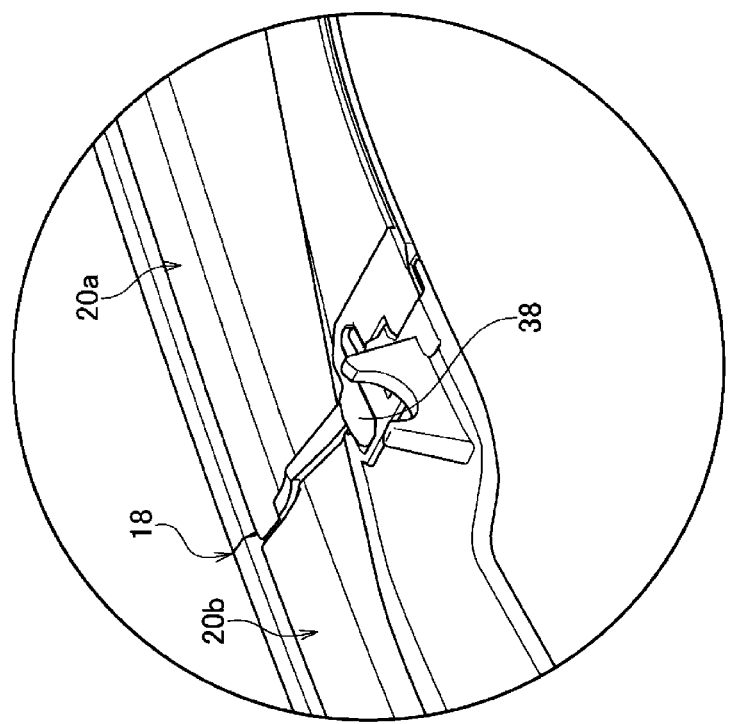
FIGS. 4A and 4B are schematic perspective views of the joint structure of the lamp component according to the embodiment as viewed from the bottom.
Figure 4A:
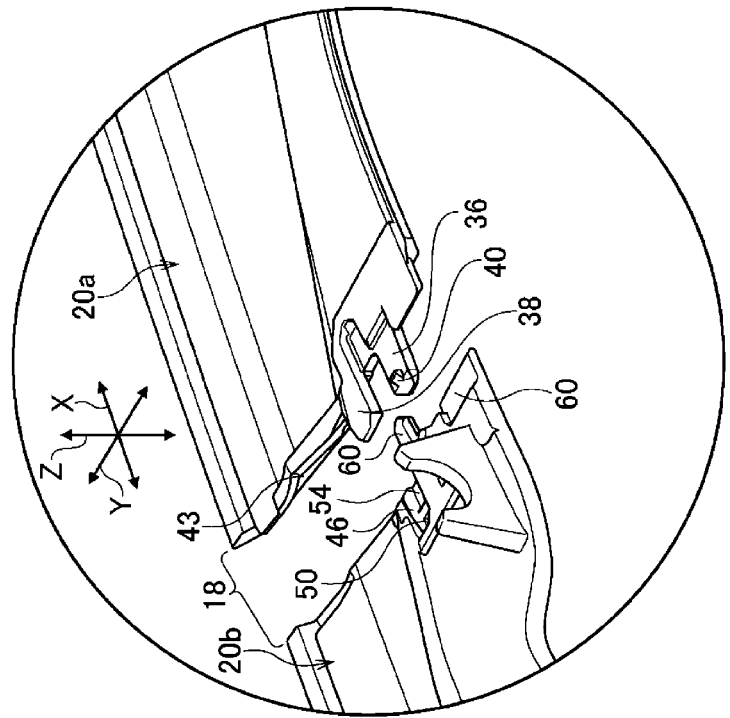

FIG. 1 is a schematic perspective view illustrating a vehicle lamp according to an embodiment. FIG. 2 is a schematic exploded perspective view illustrating a lamp unit according to the embodiment. FIGS. 3A and 3B are schematic perspective views of a joint structure of a lamp component according to the embodiment as viewed from above, and FIGS. 4A and 4B are schematic perspective views of the joint structure of the lamp component according to the embodiment as viewed from the bottom.

As illustrated in FIG. 1, the vehicle lamp 10 includes a lamp body 12 having an opening, and a transparent outer cover 14 that covers the opening of the lamp body 12. A lamp unit 16 is accommodated in a lamp chamber formed by the lamp body 12 and the outer cover 14. The lamp unit 16 is fixed to the lamp body 12.

The vehicle lamp 10 is a long vehicle lamp that extends elongatedly along a longitudinal direction X of the lamp. The vehicle lamp 10 is used, for example, as a tail lamp mounted on a rear portion of a vehicle. The vehicle lamp 10 may extend over at least half, or substantially an entire width direction of the vehicle, when mounted on the vehicle.

Although details will be described later, the lamp unit 16 includes at least one type of a lamp component that extends in the longitudinal direction X. The lamp component includes a plurality of divided parts disposed in the longitudinal direction X, and such divided parts are interconnected by a joint structure 18 as illustrated in FIG. 2.

For convenience of explanation, in the following, two directions orthogonal to each other in a plane perpendicular to the longitudinal direction X may be referred to as a transverse direction Y and a plate thickness direction Z. The lamp component has an elongated sheet-like shape in the longitudinal direction X, by way of non-limiting example. That is, the lamp component has a width and thickness that are significantly smaller than the length, and the thickness is smaller than the width. In this case, the dimension of the longitudinal direction X is the length, the dimension of the transverse direction Y is the width, and the dimension of the plate thickness direction Z is the thickness.

The lamp unit 16 includes an upper extension member 20, a reflector member 22, a light emitting element mounting substrate 25, an inner lens 26, and a lower extension member 28 as a long lamp component.

The upper extension member 20 includes three upper extension divided parts 20a to 20c. The respective upper extension divided parts 20a to 20c have an elongated sheet-like shape in the longitudinal direction X. The upper extension divided parts 20a to 20c are disposed in the longitudinal direction X, and are interconnected by the joint structure 18. That is, a pair of upper extension divided parts 20a and 20b adjacent in the longitudinal direction X are connected by the joint structure 18, and another pair of upper extension divided parts 20b and 20c adjacent in the longitudinal direction X are also connected by the joint structure 18.

In addition, the upper extension member 20 includes a first light leakage suppression structure 32 formed between the upper extension divided parts 20a and 20b so as to suppress light from leaking in the plate thickness direction Z through a boundary surface between the adjacent upper extension divided parts 20a and 20b. In the same way, the first light leakage suppression structure 32 is formed between the adjacent upper extension divided parts 20b and 20c. Details of the first light leakage suppression structure 32 will be described later.

The upper extension member 20, that is, the respective upper extension divided parts 20a to 20c may be formed of, for example, a resin material, and may have a metal surface formed by vapor deposition of a metal material such as, for example, aluminum, as needed. In the present specification, the resin material may be any general-purpose resin, such as, for example, polycarbonate, polypropylene, acrylic, acrylonitrile-styrene-acrylate (ASA), and acrylonitrile-butadiene-styrene (ABS). The members made of such resin are manufactured by, for example, injection molding or other suitable molding methods.

The reflector member 22 includes three reflector divided parts 22a to 22c disposed in the longitudinal direction X. The respective reflector divided parts 22a to 22c have an elongated sheet-like shape in the longitudinal direction X. The inner lens 26 is disposed in front of the reflector member 22 in the transverse direction Y. The reflector member 22 includes a reflecting wall 23 rearward in the transverse direction Y so as to face the inner lens 26. In addition, the reflector member 22 includes an opening 24 in a plate-shape portion that connects the reflecting wall 23 and the inner lens 26. The opening 24 penetrates the reflector member 22 in the plate thickness direction Z. As illustrated in FIG. 6B, a plurality of openings 24 aligned in the longitudinal direction X may be formed.

The reflector member 22 includes a second light leakage suppression structure 34 formed between the reflector divided parts 22a and 22b so as to suppress light from leaking in the transverse direction Y and the plate thickness direction Z through a boundary surface between the adjacent reflector divided parts 22a and 20b. In the same way, the second light leakage suppression structure 34 is formed between the adjacent reflector divided parts 22b and 22c. Details of the second light leakage suppression structure 34 will be described later.

The reflector member 22 is, for example, a white member made of resin. Alternatively, similarly to the extension member, the reflector member 22 may include a body made of resin and a metal surface.

The light emitting element mounting substrate 25 extends elongatedly in the longitudinal direction X, is disposed on the lower surface of the reflector member 22, and is fixed by a suitable method, such as, for example, caulking. The light emitting element mounting substrate 25 is, for example, a printed substrate, and a plurality of light emitting elements (e.g., LED elements or other semiconductor light emitting elements) are aligned in the longitudinal direction X on the top surface thereof. Similarly to other long members, the light emitting element mounting substrate 25 may be divided into a plurality of substrates, and the divided substrates may be disposed in the longitudinal direction X.

The inner lens 26 is formed as a single long member that extends in the longitudinal direction X. The three reflector divided members 22a to 22c are fixed to the inner lens 26 on the rear side in the transverse direction Y by a suitable method, such as, for example, lance coupling. The inner lens 26 is formed of a translucent resin, glass, or the like.

In this manner, the reflector member 22, the light emitting element mounting substrate 25, and the inner lens 26 are coupled to one another to constitute an intermediate assembly 30. The intermediate assembly 30 is configured to emit the light emitted from the light emitting element disposed on the light emitting element mounting substrate 25 from the inner lens 26. A portion of the light emitted from the light emitting element reaches the reflecting wall 23 through the opening 24 of the reflector member 22. The light is reflected by the reflecting wall 23 and passes through the inner lens 26. The light emitted from the inner lens 26 is emitted outside the lamp through the outer cover 14 illustrated in FIG. 1.

The lower extension member 28 includes two lower extension divided parts 28a and 28b. The lower extension divided parts 28a and 28b are disposed in the longitudinal direction X, and are interconnected by the joint structure 18. The lower extension member 28 may be formed of, for example, a resin material, and may have a metal surface as needed.

The intermediate assembly 30 is vertically sandwiched between the upper extension member 20 and the lower extension member 28 to constitute the lamp unit 16. The upper extension member 20, the lower extension member 28, and the intermediate assembly 30 are fixed to one another by a suitable method, such as, for example, screwing.

The number of divided parts that constitute one lamp component is not necessarily two or three, but may be any number. That is, the lamp component may include, for example, four or more divided parts disposed in the longitudinal direction X. In addition, the respective divided parts are illustrated as having substantially the same length and shape in FIG. 2, but it is not necessary. Each of the divided parts that constitute one lamp component may have different lengths and/or shapes.

The joint structure 18 will be described in more detail with reference to FIG. 3A to FIG. 4B. FIG. 3A illustrates the joint structure 18 from the upper side before being connected, and FIG. 3B illustrates the joint structure 18 from the upper side after being connected. FIG. 4A illustrates the joint structure 18 from the lower side before being connected, and FIG. 4B illustrates the joint structure 18 from the lower side after being connected.

Although the joint structure 18 that connects the first upper extension divided part 20a and the second upper extension divided part 20b is described as an example, the joint structures 18 provided at other places illustrated in FIG. 2 are basically the same.

The first upper extension divided part 20a includes a first tongue 36 and a second tongue 38. The first tongue 36 protrudes in the longitudinal direction X from the upper surface of the first upper extension divided part 20a. The first tongue 36 includes a first claw 40 on the tip of the lower surface. The second tongue 38 protrudes in the longitudinal direction X from the lower surface of the first upper extension divided part 20a. The second tongue 38 includes a second claw 42 on the tip of the upper surface.

As an example, the first tongue 36 and the second tongue 38 have the same length in the longitudinal direction X. In addition, the first tongue 36 and the second tongue 38 may have the same width in the transverse direction Y, and the same thickness in the plate thickness direction Z. The thickness of the first tongue 36 and the second tongue 38 is smaller than the width thereof, and the width is smaller than the length thereof. The length of the first tongue 36 and the second tongue 38 is significantly smaller (e.g., half or less than or equal to ⅓) than, for example, the width of the boundary surface of the two divided parts 20a and 20b (e.g., a cross section 43 of the first upper extension divided part 20a), and is larger than the thickness of the boundary surface. The respective widths of the first tongue 36 and the second tongue 38 are smaller than the width of the boundary surface, and the respective thicknesses of the first tongue 36 and the second tongue 38 are smaller than the thickness of the boundary surface.

The first tongue 36 and the second tongue 38 extend in parallel. The first tongue 36 linearly extends in the longitudinal direction X from the upper surface of the first upper extension divided part 20a, and the second tongue 38 linearly extends in the longitudinal direction X from the lower surface of the first upper extension divided part 20a. The first tongue 36 and the second tongue 38 are disposed in the intermediate portion of the upper extension member 20 in the transverse direction Y.

Meanwhile, the first tongue 36 is at a position different from that of the second tongue 38 in the transverse direction Y. Therefore, the first claw 40 is at a position different from that of the second claw 42 in the transverse direction Y.

The first claw 40 and the second claw 42 are projections formed at the tip of the first tongue 36 and the second tongue 38 respectively, and both have substantially the same shape. The first claw 40 and the second claw 42 are at the same position in the longitudinal direction X.

The second upper extension divided part 20b includes a first groove 44 and a second groove 46. The first groove 44 is formed in the longitudinal direction X on the upper surface of the second upper extension divided part 20b. The first groove 44 includes a first claw receiving hole 48 fitted into the first claw 40. The second groove 46 is formed in the longitudinal direction X on the lower surface of the second upper extension divided part 20b. The second groove 46 includes a second claw receiving hole 50 fitted into the second claw 42.

The first tongue 36 and the second tongue 38 are disposed so as to correspond to the first groove 44 and the second groove 46, respectively, such that, when the first upper extension divided part 20a and the second upper extension divided part 20b are brought close to each other along the longitudinal direction X to be connected, the first tongue 36 is inserted into the first groove 44 and the second tongue 38 is inserted into the second groove 46.

The first groove 44 is formed at a position and in a shape corresponding to the first tongue 36 so as to be engaged with the first tongue 36. The first claw receiving hole 48 is positioned innermost in the first groove 44 supposed to receive the first claw 40 positioned at the tip of the first tongue 36. In the same way, the second groove 46 is formed at a position and in a shape corresponding to the second tongue 38 so as to be fitted into the second tongue 38. The second claw receiving hole 50 is positioned innermost in the second groove 46 supposed to receive the second claw 42 positioned at the tip of the second tongue 38.

In addition, the first groove 44 includes a first claw guide groove 52 on an inlet side of the first claw receiving hole 48. The first claw guide groove 52 is provided to guide the first claw 40 when the first tongue 36 enters the first groove 44. In the same way, the second groove 46 includes a second claw guide groove 54 on an inlet side of the second groove 46 in order to guide the second claw 42 with respect to the second claw receiving hole 50 when the second tongue 38 enters the second groove 46.

The connection of the joint structure 18 is performed as follows. The connection operation is performed manually, or automatically by a machine. First, the first upper extension divided part 20a and the second upper extension divided part 20b are in a state where they are aligned in the transverse direction Y and the plate thickness direction Z, and such two divided parts are brought close to each other along the longitudinal direction X.

When the two divided parts are sufficiently brought close to each other, the first tongue 36 is inserted into the first groove 44 and the second tongue 38 is inserted into the second groove 46. The first claw 40 travels in the first claw guide groove 52, goes over the end of the first claw guide groove 52, and gets into the first claw receiving hole 48. As a result, the first claw 40 is fitted into the first claw receiving hole 48. At the same time, the second claw 42 travels in the second claw guide groove 54, goes over the end of the second claw guide groove 54, and gets into the second claw receiving hole 50. As a result, the second claw 42 is fitted into the second claw receiving hole 50.

In this manner, as illustrated in FIGS. 3B and 4B, the first upper extension divided part 20a and the second upper extension divided part 20b are connected by the joint structure 18.

The joint structure 18 provided in other places, such as at the second upper extension divided part 20b and the third upper extension divided part 20c is similarly connected.

According to the embodiment, the plurality of divided parts are connected by the joint structure 18, and the long lamp component is formed. As compared to the connection by the fastening structure using a screw or the like, the joint structure 18 simplifies the connection operation between parts. The long lamp component becomes easy to be manufactured, and the long vehicle lamp 10 is facilitated to be manufactured.

The joint structure 18 includes the first claw 40 configured to connect the upper surfaces of two adjacent divided parts of the plurality of divided parts and the first claw receiving hole 48 fitted into the first claw 40, and the second claw 42 configured to connect the lower surfaces of the two divided parts and the second claw receiving hole 50 fitted into the second claw 42. The upper surfaces of the divided parts are fixed by lance coupling, and the lower surfaces of the divided parts are fixed by lance coupling. Therefore, once connected, the two divided parts are not easily disconnected.

The first claw 40 and the first claw receiving hole 48 are formed at positions different from the second claw 42 and the second claw receiving hole 50 in the transverse direction Y of the lamp component. Assuming that the first claw 40 and the second claw 42 (that is, the first claw receiving hole 48 and the second claw receiving hole 50) are provided in the same place in the transverse direction Y, the thickness of the lamp component becomes relatively large. In contrast to this, by providing the first claw 40 and the second claw 42 displaced in the transverse direction Y as described above, even in a case where the plate thickness of the long lamp component is thin, it is advantageous in that lance coupling is easily formed on both the upper surfaces and the lower surfaces.

In addition, the first divided part of the two adjacent divided parts includes the first tongue 36 having the first claw 40 and the second tongue 38 having the second claw 42, and the second divided part includes the first groove 44 having the first claw receiving hole 48 and the second groove 46 having the second claw receiving hole 50. The first tongue 36 and the second tongue 38 are disposed so as to correspond to the first groove 44 and the second groove 46, respectively, such that, when the first divided part and the second divided part are brought close to each other along the longitudinal direction X to be connected, the first tongue 36 is inserted into the first groove 44 and the second tongue 38 is inserted into the second groove 46.

It is possible to connect the two divided parts and complete the long lamp component by a simple operation of bringing the two divided parts close to each other in the longitudinal direction X. It is not necessary to perform complicated operations such as rotating around the longitudinal direction X while bringing the two divided parts close to each other, or torsionally connecting the two divided parts with each other. By only bringing the two divided parts aligned in the transverse direction Y and the plate thickness direction Z close to each other linearly in the longitudinal direction X, the first tongue 36 and the second tongue 38 are smoothly inserted into the first groove 44 and the second groove 46, respectively, and the first claw 40 and the second claw 42 are fitted into the first claw receiving hole 48 and the second claw receiving hole 50, respectively, and thus, the connection operation may be completed.

It is not necessary to that the tongue includes the claw, and the groove includes the claw receiving hole. Conversely, the tongue may include the claw receiving hole, and the groove may include the claw. Therefore, the first divided part of the two adjacent divided parts includes the first tongue 36 having the first claw receiving hole 48 and the second tongue 38 having the second claw receiving hole 50, and the second divided part includes the first groove 44 having the first claw 40 and the second groove 46 having the second claw 42. The first tongue 36 and the second tongue 38 may be disposed so as to correspond to the first groove 44 and the second groove 46, respectively, such that, when the first divided part and the second divided part are brought close to each other along the longitudinal direction X to be connected, the first tongue 36 is inserted into the first groove 44 and the second tongue 38 is inserted into the second groove 46. In this case, in the same way, it is possible to connect the two divided parts and complete the long lamp component by a simple operation of bringing the two divided parts close to each other in the longitudinal direction X.

Figure 5A:
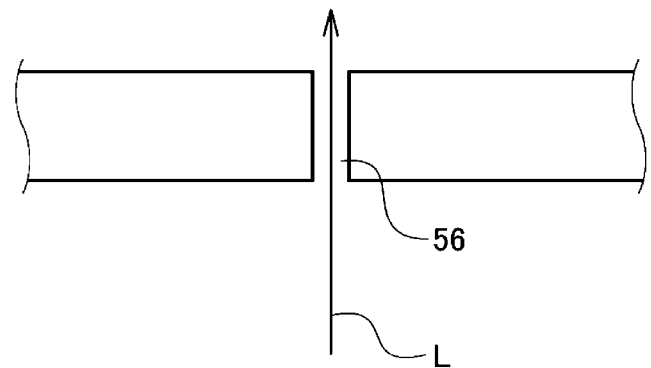
FIGS. 5A to 5C are schematic views for explaining a light leakage suppression structure according to an embodiment.
Figure 5B:
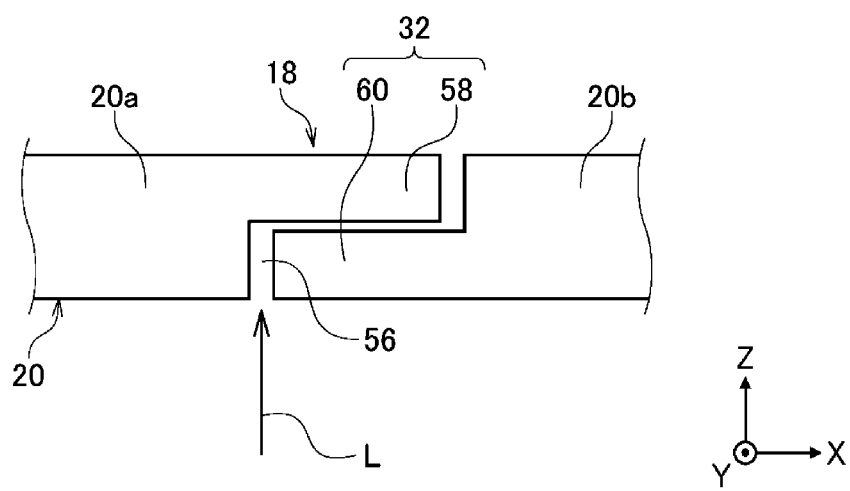
Figure 5C:
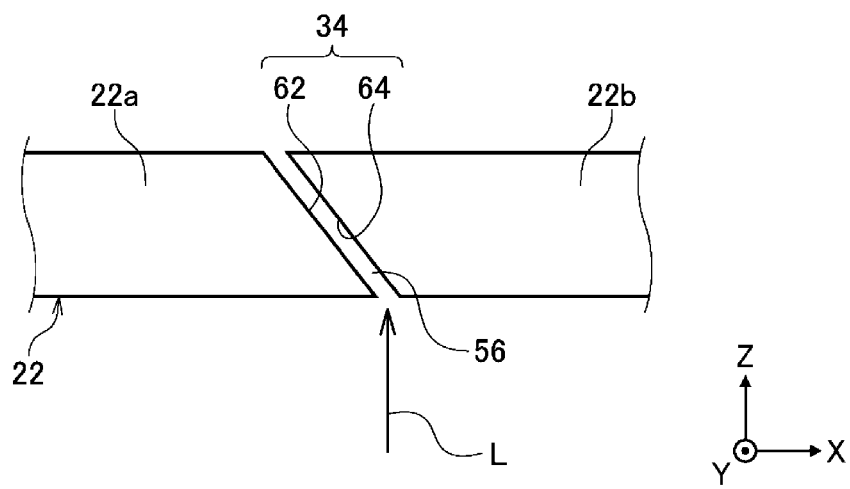

FIGS. 5A to 5C are schematic views for explaining a light leakage suppression structure according to an embodiment.

FIG. 5A illustrates a case where there is no light leakage suppression structure between divided parts as a comparative example. FIG. 5B schematically illustrates the first light leakage suppression structure 32, and FIG. 5C schematically illustrates the second light leakage suppression structure 34.

As illustrated in FIG. 5A, a gap 56 may be formed between two divided parts that constitute the long part, due to ununiformity of the mounting position which may occur in the manufacturing process, or other factors. When there is no light leakage suppression structure, the light L may leak through the gap 56 between the two divided parts. Since the leaked light may impair the appearance of the lamp which is turned ON, the leaked light may be shielded.

As illustrated in FIG. 5B, the first light leakage suppression structure 32 is formed between the first upper extension divided part 20a and the second upper extension divided part 20b. The first light leakage suppression structure 32 includes a first eave-shaped portion 58 and a second eave-shaped portion 60 to be fitted into each other. The first eave-shaped portion 58 protrudes toward the second upper extension divided part 20b from the upper surface (or lower surface) of the first upper extension divided part 20a. The second eave-shaped portion 60 protrudes toward the first upper extension divided part 20a from the lower surface (or upper surface) of the second upper extension divided part 20b. The first light leakage suppression structure 32 constitutes a portion of the joint structure 18. In addition, the first light leakage suppression structure 32 is formed of the joint structure 18 over the entire width in the transverse direction Y of the upper extension member 20.

Although it is assumed that the slight gap 56 is formed between the first upper extension divided part 20a and the second upper extension divided part 20b, the light L may not be able to pass through the gap 56 because of the engagement between the first eave-shaped portion 58 and the second eave-shaped portion 60. In this manner, the first light leakage suppression structure 32 can suppress the light from leaking in the plate thickness direction Z through the boundary surface between the adjacent upper extension divided parts 20a and 20b.

Here, referring back to FIGS. 3A and 4A, the first eave-shaped portion 58 is provided in the first upper extension divided part 20a and the second eave-shaped portion 60 is provided in the second upper extension divided part 20b. The first eave-shaped portion 58 is provided on both sides of the first tongue 36 and the second tongue 38. The second eave-shaped portion 60 is provided not only on both sides of the first groove 44 and the second groove 46, but also between the first groove 44 and the second groove 46.

As illustrated in FIG. 5C, the second light leakage suppression structure 34 is formed between the first reflector divided part 22a and the second reflector divided part 22b. As the second light leakage suppression structure 34, the first reflector divided part 22a includes a first inclined surface 62, and the second reflector divided part 22b includes a second inclined surface 64. The first inclined surface 62 and the second inclined surface 64 have the same inclination angle. When the first reflector divided part 22a and the second reflector divided part 22b are arranged in the longitudinal direction X, the first inclined surface 62 and the second inclined surface 64 may be brought into contact with each other.

Although it is assumed that the slight gap 56 is formed between the first reflector divided part 22a and the second reflector divided part 22b, the light L may not be able to pass through the gap 56 because of the inclination of the first inclined surface 62 and the second inclined surface 64. The second light leakage suppression structure 34 can suppress the light from leaking in the plate thickness direction Z through the boundary surface between the adjacent reflector divided parts 22a and 22b.

The second light leakage suppression structure 34 may suppress the light from leaking in other directions (e.g., in transverse direction Y) by adjusting the inclination angle of the first inclined surface 62 and the second inclined surface 64. Subsequently, descriptions will be made on this.

Figure 6A:
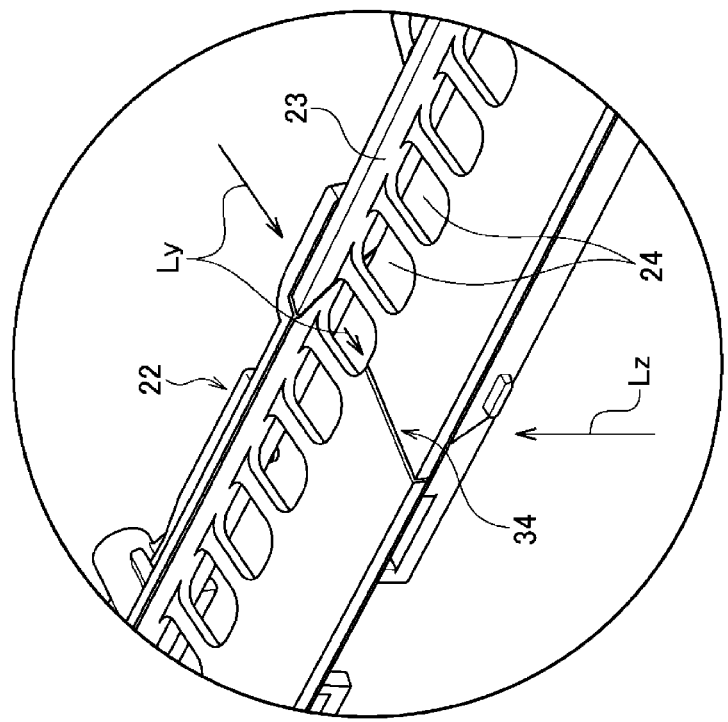
FIGS. 6A and 6B are schematic perspective views of a light leakage suppression structure of a lamp component according to an embodiment as viewed from above.
Figure 6B:
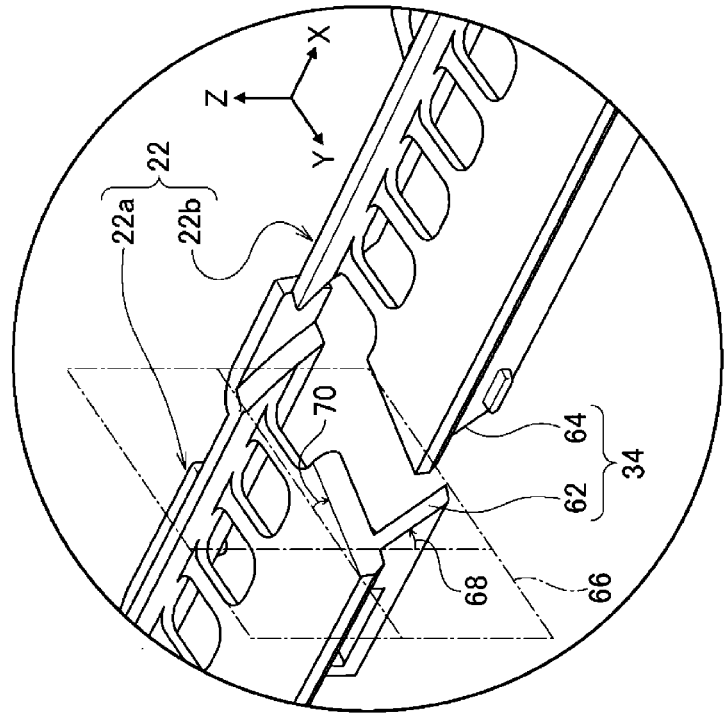
Figure 7:
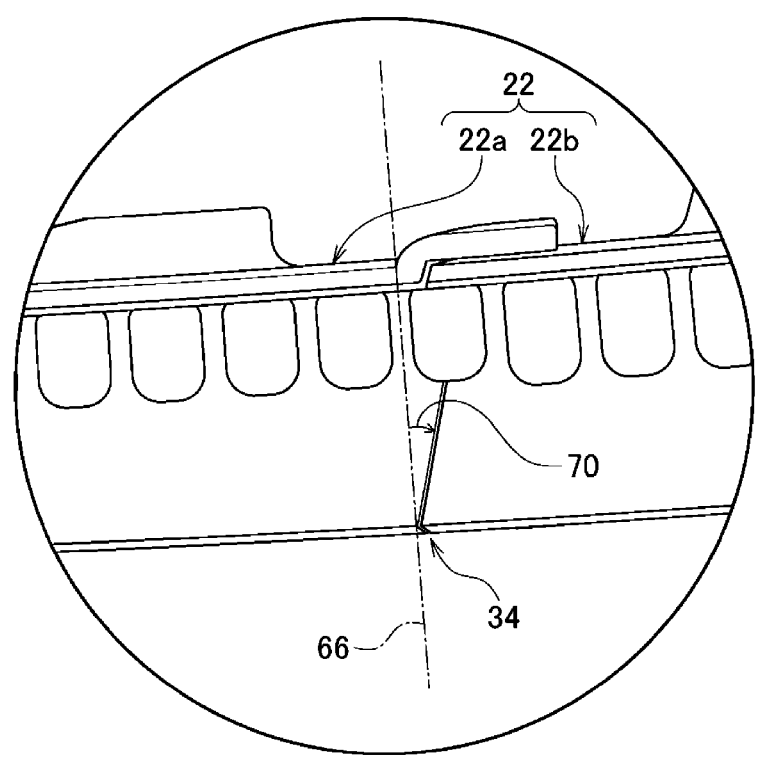
FIG. 7 is a schematic top view of the light leakage suppression structure of the lamp component illustrated in FIGS. 6A and 6B.
Figure 8:
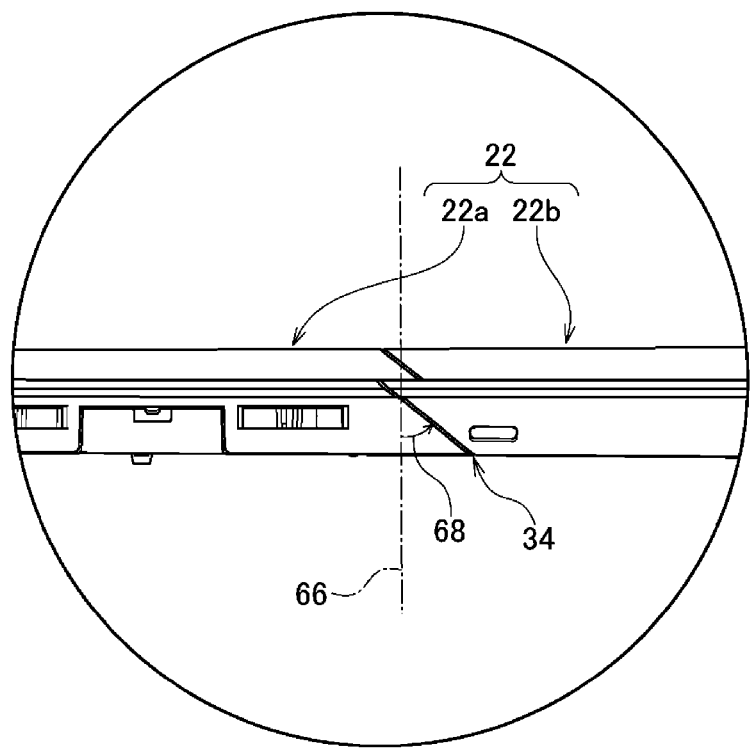
FIG. 8 is a schematic front view of the light leakage suppression structure of the lamp component illustrated in FIGS. 6A and 6B.

FIGS. 6A and 6B are schematic perspective views of a light leakage suppression structure of a lamp component according to an embodiment as viewed from above. FIG. 7 is a schematic top view of the light leakage suppression structure of the lamp component illustrated in FIGS. 6A and 6B, and FIG. 8 is a schematic front view of the light leakage suppression structure of the lamp component illustrated in FIGS. 6A and 6B.

The second light leakage suppression structure 34 before being connected is illustrated in FIG. 6A, and the second light leakage suppression structure 34 after being connected is illustrated in FIG. 6B. With reference to FIG. 6A to FIG. 8, it is understood that the first inclined surface 62 is inclined in two directions with respect to a reference surface 66 (a plane perpendicular to the longitudinal direction X, YZ plane). That is, the first inclined surface 62 is inclined by a first angle 68 around the Y axis, and inclined by a second angle 70 around the Z axis, with respect to the reference surface 66. In the same way, the second inclined surface 64 is inclined in two directions with respect to the reference surface 66.

The second light leakage suppression structure 34 may hinder the light Lz in the plate thickness direction Z from passing through between the reflector divided parts 22a and 22b by the inclination of the first angle 68 around the Y axis, and may hinder the light Lz from passing through between the reflector divided parts 22a and 22b that blocks the light Ly in the transverse direction Y by the inclination of the second angle 70 around the Z axis. Therefore, the second light leakage suppression structure 34 can suppress the light from leaking not only in the plate thickness direction Z, but also in the transverse direction Y through the boundary surface between the adjacent reflector divided parts 22a and 22b.

In the embodiment described above, although the example in which the joint structure 18 is applied to the upper extension member 20 and the lower extension member 28 is described, the joint structure 18 may be applied to other long members of the lamp unit 16, such as the reflector member 22, the light emitting element mounting substrate 25, and the inner lens 26. Alternatively, the joint structure 18 may be applied to other members that constitute vehicle lamp 10, such as the lamp body 12, and the outer cover 14. An arbitrary member that constitutes the vehicle lamp 10 may include a plurality of divided parts interconnected by the joint structure 18.

In the embodiment described above, descriptions have been made on the case where the vehicle lamp 10 is a tail lamp as an example. However, the vehicle lamp 10 is not limited to the specific example. The vehicle lamp 10 may be another marker lamp such as a turn signal lamp, a stop lamp, a clearance lamp, and a day time running lamp, or another vehicle lamp.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising a long lamp component, wherein the lamp component includes a plurality of divided parts arranged in a longitudinal direction thereof and interconnected by a joint structure,
wherein the joint structure includes:
a first claw configured to connect upper surfaces of two adjacent divided parts of the plurality of divided parts and a first claw receiving hole configured to receive the first claw; and
a second claw configured to connect lower surfaces of the two adjacent divided parts and a second claw receiving hole configured to receive the second claw,
wherein a first divided part of the two divided parts includes a first tongue having one of the first claw and the first claw receiving hole and protruding in the longitudinal direction from the upper surface of one end the first divided part, and a second tongue having one of the second claw and the second claw receiving hole and protruding in the longitudinal direction from the lower surface of the one end of the first divided part.

2. The vehicle lamp according to claim 1, wherein the first claw and the first claw receiving hole are formed at positions different from the second claw and the second claw receiving hole in a transverse direction of the lamp component.

3. The vehicle lamp according to claim 2, wherein
a second divided part of the two divided parts includes a first groove having the other of the first claw and the first claw receiving hole and formed in the longitudinal direction on the upper surface of the second divided part, and a second groove having the other of the second claw and the second claw receiving hole and formed in the longitudinal direction on the lower surface of the second divided part, and
the first tongue and the second tongue are disposed so as to correspond to the first groove and the second groove, respectively, such that, when the first divided part and the second divided part are brought close to each other along the longitudinal direction to be connected, the first tongue is inserted into the first groove and the second tongue is inserted into the second groove.

4. The vehicle lamp according to claim 3, wherein the lamp component includes a light leakage suppression structure formed between two adjacent divided parts of the plurality of divided parts to suppress light leaking in the transverse direction and/or in a plate thickness direction through a boundary surface between the two adjacent divided parts.

5. The vehicle lamp according to claim 2, wherein the lamp component includes a light leakage suppression structure formed between two adjacent divided parts of the plurality of divided parts to suppress light leaking in the transverse direction and/or in a plate thickness direction through a boundary surface between the two adjacent divided parts.

6. The vehicle lamp according to claim 1, wherein
a second divided part of the two divided parts includes a first groove having the other of the first claw and the first claw receiving hole and formed in the longitudinal direction on the upper surface of the second divided part, and a second groove having the other of the second claw and the second claw receiving hole and formed in the longitudinal direction on the lower surface of the second divided part, and
the first tongue and the second tongue are disposed to correspond to the first groove and the second groove, respectively, such that, when the first divided part and the second divided part are brought close to each other along the longitudinal direction to be connected, the first tongue is inserted into the first groove and the second tongue is inserted into the second groove.

7. The vehicle lamp according to claim 6, wherein the lamp component includes a light leakage suppression structure formed between two adjacent divided parts of the plurality of divided parts to suppress light leaking in the transverse direction and/or in a plate thickness direction through a boundary surface between the two adjacent divided parts.

8. The vehicle lamp according to claim 1, wherein the lamp component includes a light leakage suppression structure formed between two adjacent divided parts of the plurality of divided parts to suppress light leaking in the transverse direction and/or in a plate thickness direction through a boundary surface between the two adjacent divided parts.

9. The vehicle lamp according to claim 8, wherein the light leakage suppression structure includes:
a first eave portion protruding from a first divided part of the two divided parts in the longitudinal direction from an upper surface of the first divided part, and
a second eave portion protruding in the longitudinal direction from a lower surface of a second divided part of the two divided parts.

10. A vehicle lamp comprising a long lamp component, wherein the lamp component includes a plurality of divided parts arranged in a longitudinal direction thereof, and a light leakage suppression structure formed between two adjacent divided parts of the plurality of divided parts to suppress light leaking in a transverse direction and/or in a plate thickness direction through a boundary surface between the two adjacent divided parts,
wherein the light leakage suppression structure includes:
a first eave portion protruding from a first divided part of the two divided parts in the longitudinal direction from an upper surface of the first divided part, and
a second eave portion protruding in the longitudinal direction from a lower surface of a second divided part of the two divided parts,
wherein the first eave portion and the second eave portion are configured to form a boundary surface therebetween.

* * * * *